(12) United States Patent
Owens

(10) Patent No.: US 6,215,557 B1
(45) Date of Patent: Apr. 10, 2001

(54) ENTRY OF MISSING NOZZLE INFORMATION IN AN INK JET PRINTER

(75) Inventor: Brian Keith Owens, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 0 days.

(21) Appl. No.: 09/345,372

(22) Filed: Jul. 1, 1999

(51) Int. Cl.[7] .................................................. G06F 15/00
(52) U.S. Cl. ............................................. 358/1.14; 358/1.4
(58) Field of Search ................................. 358/1.1, 1.3, 1.8, 358/1.4, 1.13, 1.14, 504, 405, 406, 408; 347/11, 19, 20, 23, 40, 44, 47, 116, 117; 382/103, 112, 149, 151, 287; 399/8, 9, 12, 18, 29, 30, 41, 49, 60, 72, 81

(56) References Cited

U.S. PATENT DOCUMENTS

| | | |
|---|---|---|
| 4,178,595 | 12/1979 | Jinnai et al. . |
| 4,328,504 | 5/1982 | Weber et al. . |
| 4,587,411 | 5/1986 | Obstfelder et al. . |
| 4,587,535 | 5/1986 | Watanabe . |
| 4,796,035 | 1/1989 | Kawasaki et al. . |
| 4,907,013 | 3/1990 | Hubbard et al. . |

(List continued on next page.)

FOREIGN PATENT DOCUMENTS

| | | |
|---|---|---|
| 0 863 012 A1 | 9/1998 | (EP) . |
| 0 869 007 A2 | 10/1998 | (EP) . |
| 0 881 083 A2 | 12/1998 | (EP) . |
| 0 894 634 A2 | 2/1999 | (EP) . |
| WO96/32266 | 10/1996 | (WO) . |
| WO99/08875 | 2/1999 | (WO) . |

OTHER PUBLICATIONS

Hewlett–Packard Co., "Data Sheet for HP DesignJet CP Series Printers,"(Jun. 23, 1999).

*Primary Examiner*—Dov Popovici
*Assistant Examiner*—Gabriel I. Garcia
(74) *Attorney, Agent, or Firm*—Andrew S. Neely, Esq.; D. Brent Lambert

(57) ABSTRACT

A system identifies faulty ink jet nozzles among a plurality of ink jet nozzles in an ink jet print head based on evaluation of a test pattern printed by the print head. The printed test pattern consists of test images, where each of the test images is printed by a corresponding one of the plurality of ink jet nozzles. The test images occupy locations within the test pattern indicated by location coordinates. The test pattern is visually inspected to identify empty locations within the test pattern, where an empty location is a location in the test pattern not occupied by a test image. The empty locations are designated according to the location coordinates of the empty locations. The location coordinates of the empty locations are then correlated to ink jet nozzles that, if functioning properly, would have printed test images at the empty locations. The ink jet nozzles that, if functioning properly, would have printed test images at the empty locations are designated as faulty. The system generates a faulty nozzle record indicating which nozzles are designated as faulty among the plurality of nozzles. Based on the nozzles that are designated as faulty, the system generates print data to be sent to the print head. Based on the print data, only those nozzles which are not designated as faulty are activated in printing a desired image.

9 Claims, 3 Drawing Sheets

U.S. PATENT DOCUMENTS

| | | |
|---|---|---|
| 4,977,459 | 12/1990 | Ebinuma et al. . |
| 5,038,208 | 8/1991 | Ichikawa et al. . |
| 5,049,898 | 9/1991 | Arthur et al. . |
| 5,069,556 | 12/1991 | Sasaki et al. . |
| 5,124,720 | 6/1992 | Schantz . |
| 5,140,429 | 8/1992 | Ebinuma et al. . |
| 5,160,946 | 11/1992 | Hwang . |
| 5,189,521 | 2/1993 | Ohtsubo et al. . |
| 5,206,668 | 4/1993 | Lo et al. . |
| 5,296,876 | 3/1994 | Yamaguchi et al. . |
| 5,319,389 | 6/1994 | Ikeda et al. . |
| 5,343,231 | 8/1994 | Suzuki . |
| 5,353,052 | 10/1994 | Suzuki et al. . |
| 5,379,061 | 1/1995 | Yamaguchi et al. . |
| 5,442,382 | 8/1995 | Pfeuffer . |
| 5,475,404 * | 12/1995 | Takahashi et al. .................... 347/23 |
| 5,587,728 | 12/1996 | Edgar . |
| 5,596,353 | 1/1997 | Takada et al. . |
| 5,649,026 * | 7/1997 | Heins, III ............................. 382/175 |
| 5,650,804 | 7/1997 | Kawamura et al. . |
| 5,655,174 | 8/1997 | Hirst . |
| 5,736,996 | 4/1998 | Takada et al. . |
| 5,798,773 | 8/1998 | Hiramatsu et al. . |
| 5,847,724 * | 12/1998 | Mantell ................................. 347/15 |
| 5,887,221 * | 3/1999 | Grace .................................... 399/49 |
| 6,003,980 * | 12/1999 | Sheinman et al. ..................... 347/78 |

\* cited by examiner

ENTRY OF MISSING NOZZLE INFORMATION IN AN INK JET PRINTER

FIELD OF THE INVENTION

The present invention is generally directed to detecting malfunctioning nozzles in an ink jet printer. More particularly, the invention is directed to a system for printing and evaluating a test pattern to determine whether a nozzle has malfunctioned.

BACKGROUND OF THE INVENTION

Ink jet printers form images on paper by ejecting ink droplets from an array of nozzles on a print head. During the operational lifetime of an ink jet print head, the nozzles can become clogged, thus blocking the ejection of ink from the nozzles. Although most current ink jet printers include mechanisms for clearing clogged nozzles, these mechanisms are not always successful, and nozzles remained clogged.

Generally, when printer driver software generates print data to be sent to the print head, the software typically assumes that all of the nozzles of the print head are functioning properly. Thus, the print data may address nozzles that are malfunctioning. If this is the case, pixels that should be printed by the malfunctioning nozzles will remain blank on the paper. The typical result is an unwanted horizontal strip of white space in a printed image. As more and more nozzles malfunction during a print head's lifetime, this situation becomes more and more noticeable in printed output.

Therefore, a system is needed for identifying malfunctioning ink jet nozzles and providing this information to a printer driver so that the printer driver can compensate for the malfunctioning nozzles when generating print data.

SUMMARY OF THE INVENTION

The foregoing and other needs are met by a system that identifies faulty ink jet nozzles among a plurality of ink jet nozzles in an ink jet print head based on evaluation of a test pattern printed by the print head. The printed test pattern consists of test images, where each of the test images is printed by a corresponding one of the plurality of ink jet nozzles. The test images occupy locations within the test pattern indicated by location coordinates. The test pattern is visually inspected to identify empty locations within the test pattern, where an empty location is a location in the test pattern not occupied by a test image. The empty locations are designated according to the location coordinates of the empty locations. The location coordinates of the empty locations are then correlated to ink jet nozzles that, if functioning properly, would have printed test images at the empty locations. The ink jet nozzles that, if functioning properly, would have printed test images at the empty locations are designated as faulty.

Preferred embodiments of the invention generate a faulty nozzle record indicating which nozzles are designated as faulty among the plurality of nozzles. The faulty nozzle record is accessed to determine which of the plurality of nozzles are designated as faulty. Based on the nozzles that are designated as faulty, the system generates print data to be sent to the print head. Based on the print data, only those nozzles which are not designated as faulty are activated in printing a desired image.

Thus, the present invention maintains the quality of print produced by an ink jet print head, even when nozzles on the print head have become clogged or have otherwise malfunctioned. Image pixels that would have been left blank due to the faulty nozzles are instead printed by other functioning nozzles. In this way, the invention compensates for the failed nozzles and prolongs the useable lifetime of the print head. When implemented with a print head cartridge containing a fixed amount of ink, the invention allows continued use of the print head until all of the ink is exhausted. When implemented with a print head supplied by a replenishable ink module, the invention allows use of the print head with no loss of print quality for substantially longer than was previously practical.

In another aspect, the invention provides an apparatus for identifying faulty ink jet nozzles. The apparatus includes an ink jet print head having a plurality of ink jet nozzles disposed adjacent a print medium. The print head prints test images at test image locations on the print medium by ejecting ink droplets from each of the nozzles separately and sequentially in response to the print commands. Each one of the test images is printed by and corresponds to a different one of the plurality of nozzles. The apparatus also includes a user input device for designating an empty location within the test pattern, where the empty location is one of the test image locations in the test pattern which is void of a test image. The apparatus further includes correlation means for correlating the empty location within the test pattern with one of the ink jet nozzles that, if functioning properly, would have printed a test image at the empty location. The correlation means also generate faulty nozzle identification information based on the correlation of the empty location to the failed nozzle.

BRIEF DESCRIPTION OF THE DRAWINGS

Further advantages of the invention will become apparent by reference to the detailed description of preferred embodiments when considered in conjunction with the drawings, which are not to scale, wherein like reference characters designate like or similar elements throughout the several drawings as follows.

DETAILED DESCRIPTION OF THE INVENTION

Figure 1:
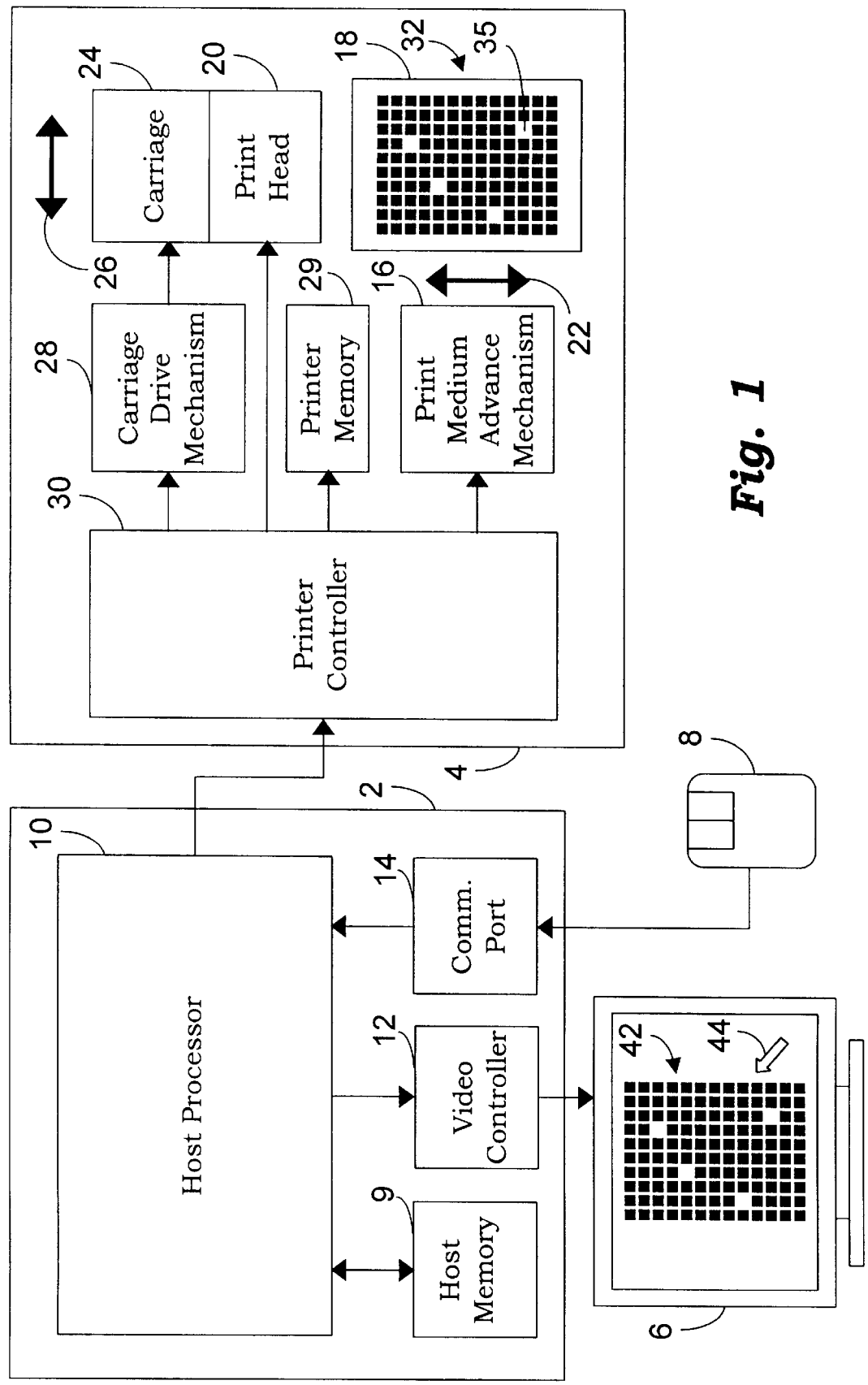
FIG. 1 is a block diagram of a system for printing and evaluating a test pattern to determine whether an ink jet nozzle has malfunctioned according to a preferred embodiment of the present invention.

Depicted in FIG. 1 is a system for identifying malfunctioning ink jet nozzles and compensating for the malfunctioning nozzles during generation of print data. The system components include a host computer 2, an ink jet printer 4, a display device 6, and a user input device 8. The configuration and operation of each of these components is described in more detail below. First, a broad overview of the invention is provided, followed by a more detailed description of the system operation.

As shown in FIG. 1, the host computer 2 generates print data that is sent to the printer 4. The print data includes information describing a test pattern 32 to be printed by the printer 4 on a print medium 18. Preferably, the test pattern 32 consists of multiple test images 33 printed in a rectangular grid. Each of the test images 33 is printed by a separate nozzle on a print head 20 of the printer, so that a test image 33 is printed corresponding to each nozzle. If a nozzle malfunctions, there will be no test image 33 printed corresponding to that nozzle, resulting in an empty location 35. After the pattern 32 has printed, a system user visually inspects the test pattern 32, looking for blank areas that indicate an empty location 35. The host computer 2 also generates a graphic image 42 on the display device 6. The graphic image 42 is preferably a grid representing the test pattern 32 that was printed on the printer 4. Using the input device 8, the user places a cursor 44 on the grid at the location corresponding to the empty location 35 in the test pattern 32. The user then designates the empty location 35 by clicking on the corresponding grid location using the input device 8. As described in more detail below, the host computer 2 uses this information provided by the user to modify the print data that is subsequently sent to the printer 4.

With reference to FIG. 1, the host computer 2 includes a host processor 10, such as a Pentium processor manufactured by Intel. The host processor 10, under control of printer driver software, generates the print data that is sent to the printer 4 to create printed images. The host processor 10 also generates video data that is sent to a video controller 12. The video controller 12 receives the video data and generates corresponding video signals that are sent to the display device 6. The display device 6, such as a CRT monitor or an LCD display, receives the video signals and generates the graphic image 42 based thereon. The user input device 8, such as a mouse, is connected to a communication port 14 of the host computer 2. The host computer 2 also includes a host memory device 9, such as a random access memory (RAM) and/or a magnetic disk drive.

Figure 2:
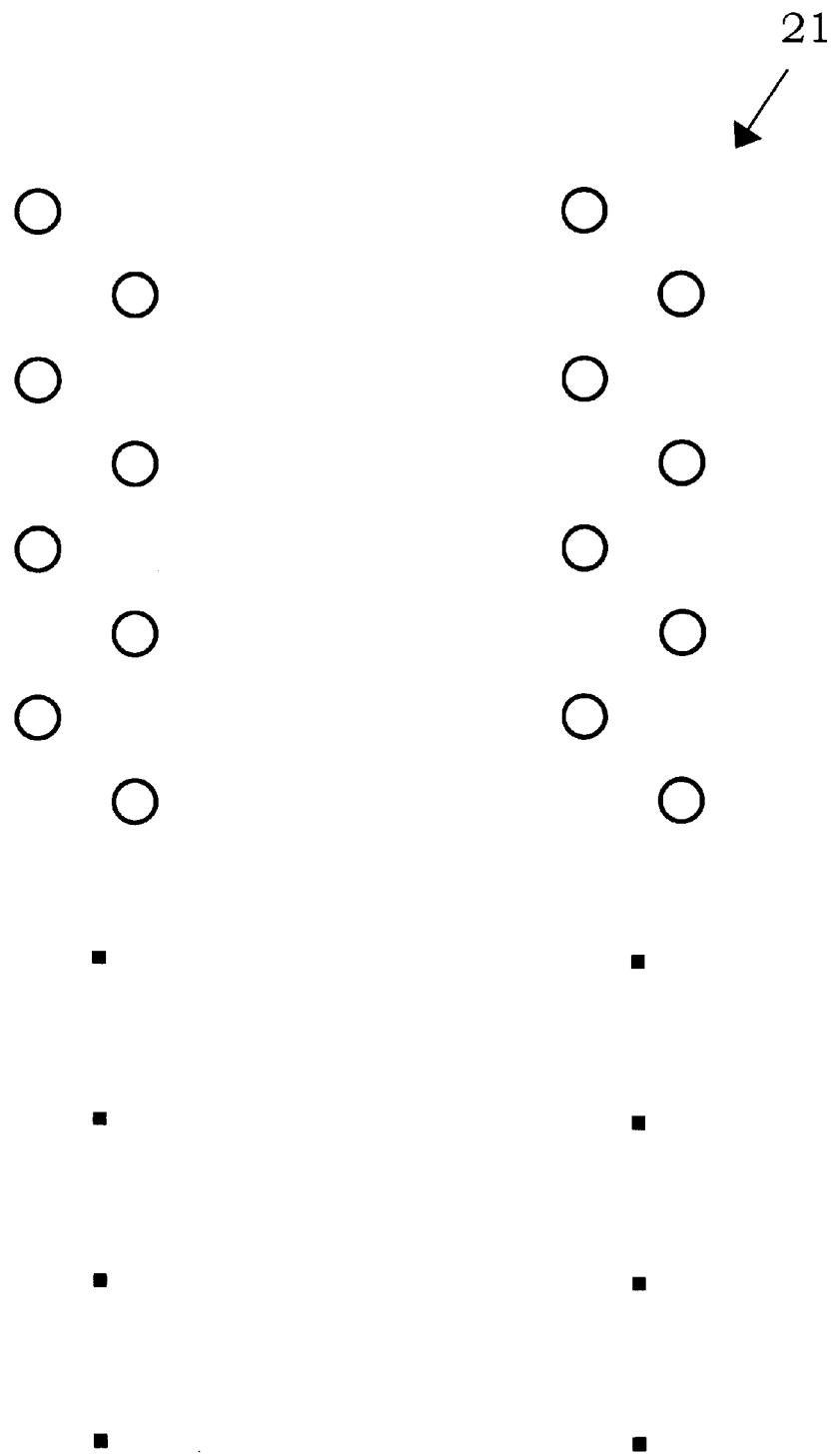
FIG. 2 depicts an array of ink jet nozzles according to a preferred embodiment of the present invention.

The printer 4 includes a print medium advance mechanism 16 for advancing the print medium 18, such as paper, relative to the print head 20. Preferably, the print medium advance mechanism 16 includes a motor that mechanically drives a roller to cause the print medium 18 to move in the direction indicated by the arrow 22. Hereinafter, the direction indicated by the arrow 22 is referred to as a first or vertical direction. The print head 20 includes an array of nozzles 21, such as shown in FIG. 2, for ejecting droplets of ink onto the print medium 18, where each droplet of ink forms a dot on the medium 18. The printer 4 also includes a carriage 24 that is mechanically connected to the print head 20 for moving the print head 20 adjacent to the print medium 18. Preferably, the carriage 24 rides along a rail in the direction indicated by the arrow 26. Hereinafter, the direction indicated by the arrow 26 is referred to as a second or horizontal direction. A carriage drive mechanism 28 is mechanically coupled to the carriage 24 for driving the carriage 24 in the horizontal direction.

As shown in FIG. 1, the printer 4 includes a printer controller 30. The printer controller 30 is preferably a digital microcontroller that receives the print data from the host processor 10 and generates printer drive signals based on the print data. As described in more detail hereinafter, the printer drive signals control the carriage drive mechanism 28, the print medium advance mechanism 16, and the print head 20 to produce the test pattern 32 on the print medium 18.

Figure 3:
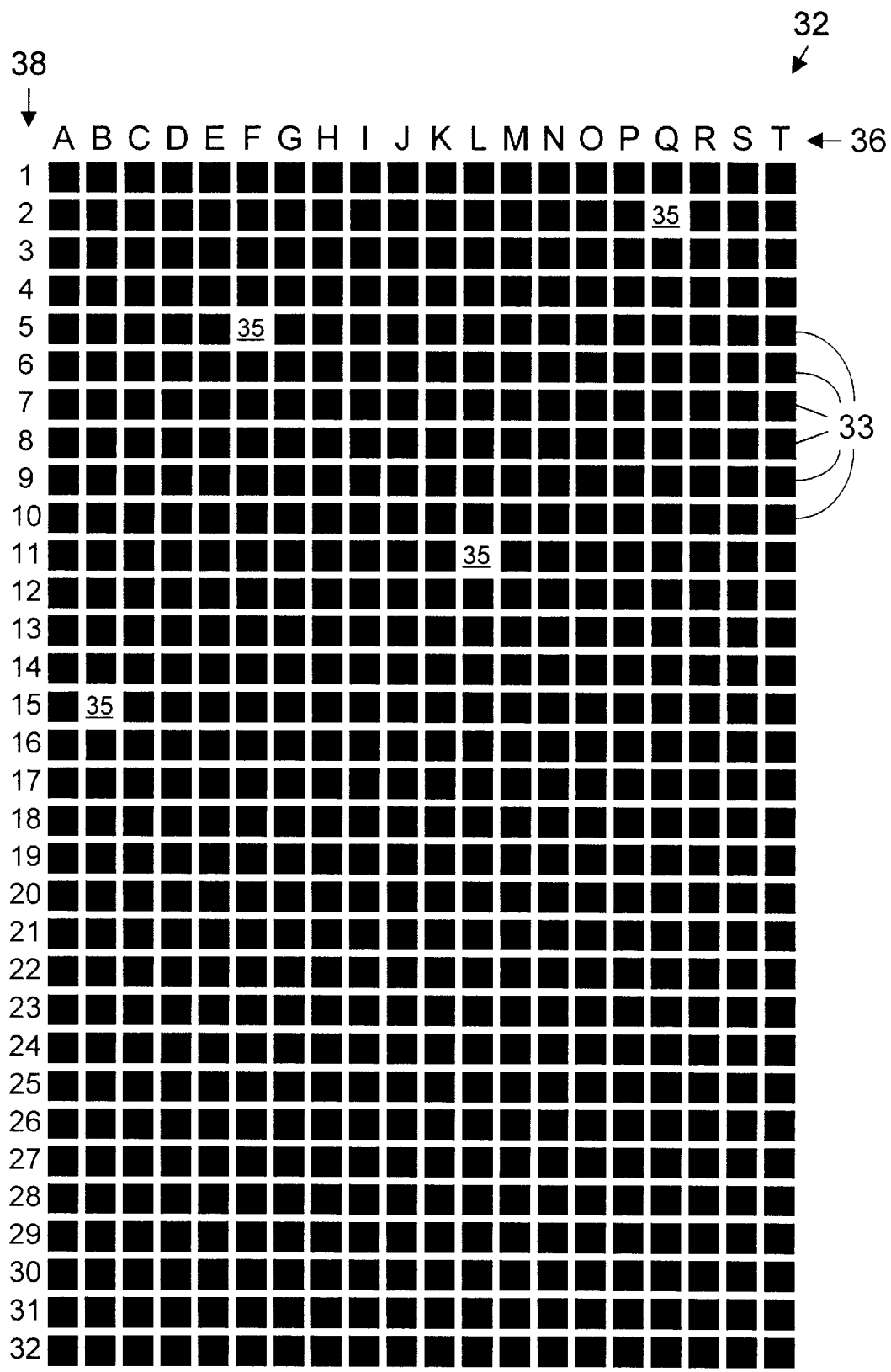
FIG. 3 depicts a test pattern printed according to a preferred embodiment of the present invention.

Preferably, the host processor 10 carries out the functions described herein under control of printer driver software. Based on the printer driver instructions, the host processor 10 generates print data describing the test pattern 32 to be printed by the printer 4. A more detailed depiction of an exemplary test pattern 32 is shown in FIG. 3. The test pattern 32 is preferably a rectangular grid on which a test image 33 is printed for each nozzle of the print head 20. In the preferred embodiment, each test image 33 is a square block having sides of about 0.25 to 0.5 inch in length. The test pattern 32 of FIG. 3 is a 20×32 grid of 0.25 inch squares, providing 640 test images 33. Thus, as shown in FIG. 3, test images 33 for up to 640 nozzles can be easily accommodated on a single sheet of A4 or 8½×11 inch paper. Although the example described herein assumes a 640-nozzle print head, it will be appreciated that the invention is not limited to any particular number of nozzles.

In the preferred embodiment of the invention, the host processor 10 transfers the print data describing the test pattern 32 to the printer controller 30. Based on the print data from the host processor 10, the controller 30 generates print, scan, and advance commands to cause the print head 20 to fire only nozzle 1 (see FIG. 2) to print the test image 33 at the location A1 in the test pattern 32 as shown in FIG. 3. Subsequently, the test image 33 at the location A2 is printed using only nozzle 2. This process continues until each nozzle on the print head 20 has printed a test image 33 at a predetermined location in the pattern 32.

As shown in FIG. 3, the test pattern 32 preferably includes horizontal indicia 36 (A, B, C, . . . ) across the top and/or bottom of the pattern 32 and vertical indicia 38 (1, 2, 3, . . . ) along one or both sides of the pattern 32. As described in more detail below, these indicia 36 and 38 aid the user in designating empty locations 35 in the pattern 32.

When printing of the test pattern 32 has completed, the user inspects the pattern 32 to find areas within the grid that are void of test images 33. For example, in the test pattern 32 of FIG. 3, the user would observe that test images 33 are missing from locations Q2, F5, and B15. These empty locations 35 indicate that the nozzles corresponding to these locations 35 have malfunctioned. The user designates these empty locations 35 to the host computer 2 using the display device 6 and the input device 8, as described in greater detail below.

With reference again to FIG. 1, the host processor 10 generates image data representing the graphic image 42 displayed on the display device 6. The video controller 12 receives the image data from the host processor 10 and generates video signals based on the image data. The display device 6 receives the video signals from the video controller 12 and produces the graphic image 42 based in the video signals. Preferably, as shown in FIG. 1, the graphic image 42 closely resembles the rectangular grid of the test pattern 32, with each block in the graphic image 42 corresponding to a different one of the test images 33 in the test pattern 32.

While viewing the graphic image 42 on the display device 6, the user designates the blocks in the graphic image 42 that correspond to the empty locations 35 of the test pattern 32. Using the user input device 8, the user positions the cursor 44 over a block corresponding to an empty location 35 in the test pattern 32. The user then designates the block by "clicking" on the block using the input device 8. When the user clicks on the block, the input device 8 generates a cursor position signal that is received by the communication port 14. The cursor position signal includes information indicating the rectangular (x-y) coordinates of the location of the cursor 44 relative to the graphic image 42.

The host processor 10 receives the cursor position signal from the communication port 14, and translates the rectangular coordinates of the cursor location into a grid location in the graphic image 42. For example, when the user positions the cursor 44 anywhere within the grid block L11 and clicks on the block using the input device 8, the host processor 10 receives the x-y coordinates in the cursor position signal and correlates those coordinates as corresponding to the L11 block. Based on the coordinates in the cursor position signal, the host processor 10 generates a block identification signal which, in the above example, would identify the L11 block. This procedure is repeated for each empty location 35 in the test pattern 32.

Based on the block identification signal, the host processor 10 updates the graphic image data to change the appearance of the block identified by the block identification signal. Preferably, the color of the designated graphic image block on the display 6 is changed to indicate that the particular block has been designated as representing a malfunctioning nozzle location.

After the user has designated each of the empty locations 35 in the test pattern 32 as described above, the host processor 10 accesses a lookup table stored in the host memory device 9 that cross-references block locations to nozzle locations. For the print head of the above example, there are 640 block locations (A1, A2, A3, etc.) in the lookup table corresponding to 640 nozzles. In a preferred embodiment, each nozzle is identified by a unique nozzle number (1, 2, 3, . . . 640), as shown in FIG. 2. Thus, the lookup table of the preferred embodiment correlates block locations (A1, A2, A3, . . . T32.) to nozzle numbers (1, 2, 3, . . . 640).

Based on the lookup table, the host processor 10 generates a faulty nozzle record, such as in the form of a mask file, to record the faulty nozzle locations. Preferably, the mask file is simply a word having at least as many bits as there are nozzles. For example, for the 640-nozzle print head, the mask file consists of a word having at least 640 bits. The state of each bit in the word indicates the state of each nozzle in the print head. Preferably, the mask file is stored in the host memory device 9 for later access by the host processor 10. Alternatively, the mask file is transferred to printer memory 29 for later access by the printer controller 30.

In the preferred embodiment, the printer driver accesses the mask file when generating print data to be sent to the printer controller 30. Based on the mask file, the printer driver determines which of the nozzles on the print head 20 are good and which are faulty. If the mask file indicates that one or more nozzles are faulty, the printer driver alters the print data to bypass the faulty nozzles. Thus, image pixels that would have been printed by the faulty nozzles are printed by one or more neighboring good nozzles.

According to the preceding description, a printer driver running on the host processor 10 generates commands that control the printing of the test pattern 32. It will be appreciated, however, that the invention is not limited to generating these commands in the host processor 10. In an alternative embodiment, firmware in the printer controller 30 could control the generation of the test pattern 32 with minimal intervention from the host processor 10. In that embodiment, the printer driver on the host processor 10 may merely send a single command to initiate the test pattern printing process.

In another embodiment, when the printer controller 30 receives print data describing an image to be printed, the controller 30 accesses the mask file stored in the printer memory 29 and generates printer drive signals based on the print data and the mask file. Based on the mask file, the controller 30 alters the printer drive signals to print the desired image using only good nozzles. In this embodiment, the print data is not altered to compensate for the faulty nozzles. Instead, the controller 30 compensates by altering the drive signals to the print head to bypass the faulty nozzles.

It is contemplated, and will be apparent to those skilled in the art from the preceding description and the accompanying drawings that modifications and/or changes may be made in the embodiments of the invention. Accordingly, it is expressly intended that the foregoing description and the accompanying drawings are illustrative of preferred embodiments only, not limiting thereto, and that the true spirit and scope of the present invention be determined by reference to the appended claims.

What is claimed is:

1. A method for identifying faulty ink jet nozzles among a plurality of ink jet nozzles in an ink jet print head based on a test pattern printed by the print head, the method comprising the steps of:

printing the test pattern comprising test images, where each test image is printed by a corresponding one of the plurality of the ink jet nozzles, and where the test images occupy locations within the test pattern indicated by location coordinates;

visually inspecting the test pattern to identify empty locations within the test pattern, the empty locations being locations in the test pattern not occupied by corresponding ones of the test images;

designating the empty locations according to the location coordinates of the empty locations;

correlating the location coordinates of the empty locations to the ink jet nozzles that, if functioning properly, would have printed the test images at the empty locations; and designating as faulty the ink jet nozzles that, if functioning properly, would have printed the test images at the empty locations.

2. The method of claim 1 further comprising the steps of:

generating a faulty nozzle record indicating which of the ink jet nozzles are designated as faulty among the plurality of the ink jet nozzles;

accessing the faulty nozzle record to determine which of the plurality of the ink jet nozzles are designated as faulty; and generating print data to be sent to the print head, where the print data causes activation of the ink jet nozzles to print an image on a print medium, the generating taking into account the ink jet nozzles which are designated as faulty, such that the print data causes activation of only those of the ink jet nozzles which are not designated as faulty.

3. The method of claim 1 wherein the printing step further comprises printing each of the test images as a square block having sides of approximately 0.25 inch in length.

4. The method of claim 1 wherein the step of designating the empty locations further comprises:

(a) generating a visual image of the test pattern on a graphical user interface, the visual image consisting of blocks arranged in a rectangular grid, where each of the blocks represents a location within the test pattern;

(b) placing a cursor in the visual image at a cursor location corresponding to a block in the grid, where the block corresponds to an empty location in the test pattern;

(c) generating coordinates of the cursor location;

(d) correlating the coordinates of the cursor location with the empty location in the test pattern; and (e) repeating steps (a)–(d) for each empty location in the matrix.

5. The method of claim 1 wherein the step of printing a test pattern further comprises printing indicia on the test pattern that are related to the location coordinates.

6. An apparatus for identifying faulty ink jet nozzles, the apparatus comprising:

an ink jet print head comprising a plurality of ink jet nozzles disposed adjacent to a print medium, the print head for printing a test pattern comprising a printed grid of test images at test image locations on the print medium by ejecting ink droplets from each of the ink jet nozzles separately and sequentially in response to a print commands, where each one of the test images is printed by a different one of the plurality of ink jet nozzles, and where each one of the test images corresponds to a different one of the plurality of ink jet nozzles;

a processor for generating video image information describing a video image, the video image comprising a plurality of test image designation areas arranged in a video grid, where each one of the plurality of test image designation areas in the video grid corresponds to a different one of the test image locations in the printed grid;

a video display device for receiving the video image information and for displaying the video image based on the video image information, the video display device further for displaying a cursor at a location within the video image, the location of the cursor based on a cursor position signal;

a pointing device for designating an empty location within the test pattern, the empty location being one of the test image locations in the test pattern which is void of the test image, the pointing device for designating the empty location by generating the cursor position signal when the cursor is positioned at one of the test image designation areas in the video grid corresponding to the empty location in the printed grid; and correlation means for receiving the cursor position signal, determining the empty location based thereon, and correlating the empty location within the test pattern with one of the ink jet nozzles that, if functioning properly, would have printed the test image at the empty location, and for generating faulty nozzle identification information based thereon.

7. The apparatus of claim 6 further comprising:

memory means for storing the faulty nozzle identification information; and print head control means for accessing the faulty nozzle identification information and for generating print commands to be sent to the print head based at least in part on the faulty nozzle identification information, where the print commands cause activation of only the ink jet nozzles on the print head which are not designated as faulty.

8. The apparatus of claim 6 further comprising:

the pointing device for generating the cursor location signal to be indicative of location coordinates of the test image designation area in the video image corresponding to the empty location in the test pattern; and the correlation means for correlating the location coordinates of the test image designation area with the one of the ink jet nozzles that, if functioning properly, would have printed the test image at the empty location.

9. A computerized process for identifying faulty ink jet nozzles among a plurality of ink jet nozzles in an ink jet print head based on a test pattern printed by the print head, the process comprising the steps of:

printing the test pattern comprising test images, where each of the test images is printed by a corresponding one of the ink jet nozzles;

displaying a video image consisting of test image designation areas, where each one of the test image designation areas corresponds to a different one of the test images in the test pattern;

positioning a cursor within the video image at one of the test image designation areas in the video image corresponding to an empty location in the test pattern, the empty location being a location in the test pattern not occupied by a corresponding one of the test images;

generating a cursor position signal as the cursor is positioned, the cursor position signal being indicative of location coordinates of the cursor as the cursor is positioned at the one of the test image designation areas in the video image corresponding to an empty location in the test pattern;

correlating the location coordinates of the cursor to a corresponding one of the ink jet nozzles that, if functioning properly, would have printed the corresponding test image at the empty location; and designating as faulty the ink jet nozzle that, if functioning properly, would have printed the corresponding test image at the empty location.

* * * * *